United States Patent
Hunnicutt

Patent Number: 5,593,133
Date of Patent: Jan. 14, 1997

[54] VARIABLE ASSIST STEERING PRESSURE CONTROL VALVE

[75] Inventor: Harry A. Hunnicutt, Ann Arbor, Mich.

[73] Assignee: Kelsey-Hayes Company, Romulus, Mich.

[21] Appl. No.: 444,464

[22] Filed: May 19, 1995

[51] Int. Cl.⁶ .................................... F16K 31/02
[52] U.S. Cl. ....................... 251/129.15; 137/242
[58] Field of Search ............... 251/129.07, 129.15; 137/242, 244

[56] References Cited

U.S. PATENT DOCUMENTS

| | | | |
|---|---|---|---|
| 1,752,667 | 4/1930 | Hutchings | 137/244 |
| 3,732,893 | 5/1973 | Ziesche et al. | 251/129.05 X |
| 3,908,779 | 9/1975 | Inoue | |
| 4,423,841 | 9/1984 | Palma | 251/129.15 X |
| 4,647,008 | 3/1987 | Shirai et al. | 251/129.07 |
| 4,662,604 | 5/1987 | Cook | 251/129.07 |
| 4,852,853 | 8/1989 | Toshio et al. | 251/129.07 |
| 4,858,956 | 8/1989 | Taxon | 251/129.07 |
| 5,122,958 | 6/1992 | Eto et al. | |
| 5,133,424 | 7/1992 | Fox et al. | |
| 5,346,175 | 9/1994 | Hunnicutt | |

*Primary Examiner*—Hoang Nguyen
*Attorney, Agent, or Firm*—MacMillan, Sobanski & Todd

[57] ABSTRACT

A control valve for use in a variable assist power steering system of a vehicle having a valve element disposed within a valve chamber formed in a valve housing. The valve element is connected by a coupling to a proportional solenoid which is mounted upon the valve housing. The solenoid includes an axially movable armature which is connected by a coupling to the valve element. The coupling transfers axial movement of the solenoid armature to the valve element. The coupling also is operable to minimize the transfer of transverse movement of the solenoid armature to the valve element.

19 Claims, 3 Drawing Sheets

VARIABLE ASSIST STEERING PRESSURE CONTROL VALVE

BACKGROUND OF THE INVENTION

This invention relates in general to vehicle power steering systems and in particular to a variable orifice control valve which varies the amount of assistance provided by a power steering system.

Power steering systems are included in many vehicles to reduce the effort required by the vehicle operator to steer the vehicle. Such systems usually include a hydraulically activated actuator which provides assistance in moving the vehicle steering linkage when the steering wheel is rotated. The amount of assistance provided is a function of the steering torque exerted upon the steering wheel by the vehicle operator with the amount of assistance increasing as the operator exerts an increased steering torque. In the past, for any given amount of steering torque, the same amount of assistance has been provided. Recently, however, variable assist power steering systems have been developed which vary the amount of assistance provided for a given amount of steering torque as a function of a vehicle operating parameter, such as vehicle speed. Such systems provide greater assistance for low speed maneuvers, such as parking and less assistance at high speeds where the assistance can detract from the operator's feel of the road.

A typical variable assist hydraulic power steering system is illustrated generally at 10 in FIG. 1. The vehicle steering wheel 11 is coupled to a primary rotary control valve 12 which closes at a low steering torque. A torsion bar 13 couples the primary rotary control valve 12 to a secondary rotary control valve 14 which closes at a relatively high steering torque.

The primary rotary control valve 12 receives pressurized hydraulic fluid from a pump 15. An orifice 16 and relief valve 17 are connected between the pump 15 and the primary rotary control valve 12. The orifice 16 and relief valve 17 are operable to maintain a constant rate of flow for the fluid supplied from the pump 15. The relief valve 17 discharges into a fluid reservoir 18 which is typically located adjacent to the pump 15. The reservoir 18 supplies hydraulic fluid to the pump 15 (not shown).

The primary rotary control valve 12 is connected to a hydraulically activated actuator 19 and is operative to supply hydraulic fluid to the actuator 19 at a pressure which is a function of the torque applied to the steering wheel 11 by the vehicle operator. The actuator 19 is coupled to the vehicle steering linkage (not shown) and is operable in a known manner to move the steering linkage. Hydraulic fluid is discharged from the primary rotary control valve 12 and returned to the reservoir 18 through a hydraulic line.

The secondary rotary control valve 14 also receives pressurized hydraulic fluid from the pump 15. A control valve 20 is connected between the secondary rotary control valve 14 and the pump 15. The control valve 20 has a variable orifice and is operable to vary the volume of hydraulic fluid flowing to the secondary rotary control valve 14. The control valve 20 is actuated by an electronic control module (ECU) 21 which receives a vehicle speed signal from a speed sensor 22. The control valve 20 is responsive to the electronic control module 21 to open the valve orifice as the vehicle speed increases and to close the valve orifice as the vehicle speed decreases. Hydraulic fluid is discharged from the secondary rotary control valve 14 and returned to the reservoir 18 through a hydraulic line.

During operation of the power steering system 10, opening the control valve orifice adds a portion of the secondary rotary control valve area to the area of the primary rotary control valve increasing the total effective rotary control valve area of the power steering system 10. Because the pump 15 supplies the hydraulic fluid at a constant flow rate, the larger effective rotary control valve area reduces the pressure of the hydraulic fluid supplied to the actuator 19. This decreases the amount of assistance provided to the vehicle operator and increases the stiffness of the feel of the steering system 10. When the control valve orifice is fully open, the total rotary control valve area is essentially the sum of the primary and secondary rotary control valve areas.

Conversely, closing the control valve orifice decreases the total effective rotary control valve area, raising the pressure of the hydraulic fluid supplied to the actuator 19. This increases the amount of assistance provided to the vehicle operator and decreases the stiffness of the feel of the power steering system 10. When the control valve orifice is fully closed, the effective area of the rotary: control valves 12 and 14 becomes that of only the primary rotary control valve 12.

A known control valve having a variable orifice is shown generally at 25 in FIG. 2. The control valve 25 includes a valve housing 26 having a generally cylindrical valve chamber 27 formed therein. The valve chamber 27 communicates with an inlet port 28 which is connected to the pump 15. The valve chamber 27 also communicates with an outlet port 29 which is connected to the secondary rotary control valve 14. A first end of the valve chamber 27 receives a threaded plug 30 which has an axial bore 31 formed therein. The plug 30 also has an annular recess 32 formed therein. A transverse bore 33 extends from the annular recess 32 through the plug 30 and communicates with the inlet port 28.

An axially shiftable valve spool 34 is disposed in the axial bore 31 of the plug 30. The valve spool 34 has an axial bore 35 formed therethrough. The valve spool 34 also has a first transverse bore 36 having a relatively small diameter and a second transverse bore 37 having a relatively large diameter which extend through the axial bore 35. As shown in FIG. 2, the plug 30 blocks communication between the first transverse bore 36 and the inlet port 28 while the second transverse bore 37 communicates with the outlet port 29. When the valve spool 34 is shifted to the right in FIG. 2, the first transverse bore 36 cooperates to with the annular recess 32 in the plug 30 to define a variable orifice which provides communication between the inlet and outlet ports 28 and 29.

The valve spool 34 is connected to a shaft 38 of a stepper motor 39. The stepper motor 39 is electrically connected to the electronic control module 21. The stepper motor 39 is responsive to signals generated by the control module 21 to rotate the shaft 38 a predetermined amount. As the shaft 38 rotates, the shaft 38 also moves axially into or out of the valve chamber 27. The axial movement of the shaft 38 shifts the valve spool 34 within the valve chamber 27 to vary the size of the orifice formed between the first transverse bore 36 and the annular recess 32.

As illustrated in FIG. 2, the valve spool 34 is extended to the left, closing the orifice and blocking the flow of hydraulic fluid to the secondary rotary control valve 14. Accordingly, the associated power steering system 10 is operable with only the primary rotary control valve 12 and maximum assistance is provided to the vehicle operator. This condition corresponds to low speed vehicle operation.

The electronic control module 21 is responsive to an increase in vehicle speed to supply an electrical signal to the stepper motor 39. The signal causes the stepper motor 39 to rotate, shifting the shaft 38 and valve spool 34 to the right in FIG. 2. As the valve spool 34 shifts to the right, the orifice formed between the first valve spool transverse bore 36 and the plug annular recess 32 is opened, allowing hydraulic fluid to flow through the control valve 25 to the secondary rotary control valve 14. As explained above, the flow of hydraulic fluid to the secondary rotary control valve 14 reduces the pressure of the hydraulic fluid supplied to the actuator 19. This decreases the amount of assistance provided by the power steering system 10 and increases the stiffness of the power steering system 10. As the vehicle speed further increases, the stepper motor 39 shifts the valve spool 34 further to the right, exposing a greater area of the orifice. This increases the flow of hydraulic fluid through the control valve 25 which further reduces the pressure of the hydraulic fluid supplied to the actuator 19. Accordingly, the amount of assistance provided by the power steering system 10 is further reduced and the stiffness of the power steering system 10 is further increased.

When the vehicle speed is reduced, the electronic control unit 21 causes the stepper motor 39 motor to rotate in a reverse direction shifting the armature 38 and the valve spool 34 to the left in FIG. 2. The shift of the valve spool 33 reduces the size of the orifice which restricts the flow of hydraulic fluid to the secondary rotary control valve 14. This increases the pressure of the hydraulic fluid supplied to the actuator 19, increasing the amount of assistance provided by the power steering system 10 and decreasing the stiffness of the power steering system 10.

SUMMARY OF THE INVENTION

This invention relates to an improved control valve which has a variable orifice for controlling the amount of steering assistance supplied to a vehicle operator by a power steering system.

As indicated above control valves are known which have a valve spool positioned by a stepper motor. However, stepper motors are expensive and have a slow response. Accordingly, it is desirable to reduce the cost of a control valve by replacing the stepper motor with a proportional solenoid. A typical proportional solenoid includes an axially movable armature. The solenoid armature is coupled to the valve spool by a one piece actuator rod which transfers axial movement of the armature to the valve spool. The actuator rod passes through an actuator rod bushing which guides the actuator rod.

Due to manufacturing tolerances, the armature may move transversely when it moves axially. Any transverse movement of the armature can exert a bending moment on the actuator rod, causing the valve spool to bind within the valve housing and putting side loads on the actuator rod bushing. This can cause drag and hysterisis in the valve response. Thus, it would be desirable to reduce the bending moment exerted by the solenoid armature upon the actuator rod.

The present invention contemplates an improved control valve for use in a variable assist power steering system of a vehicle. The control valve includes a valve housing having a valve chamber formed therein. The valve housing has inlet and outlet ports formed therein which communicate with the valve chamber and are adapted to receive and discharge fluid, respectively. The control valve also has a valve element disposed within the valve chamber which cooperates with the valve housing to define a variable orifice for communication between the inlet and outlet ports. The valve element is movable within the valve chamber to vary the size of the orifice to control the flow of fluid through the valve chamber.

A solenoid having an axially movable armature is carried by the housing. A coupling connects the solenoid armature and the valve element for transferring axial movement of the solenoid armature to the valve element. The coupling is operable to minimize the transfer of transverse movement of the solenoid armature to the valve element. Similarly, the coupling is operable to minimize the transfer of transverse movement of the valve element to the solenoid armature.

The invention further contemplates a coupling which includes a first actuator rod carried by the solenoid armature and extending into the valve chamber. The coupling also includes a second actuator rod disposed in the valve chamber which has first and second ends. The first end of the second actuator rod slidably engages the first actuator rod and is free to pivot relative thereto. The second end of the second actuator rod engages the valve element.

Additionally, the second end of the second actuator rod can slidably engage the valve element and be free to pivot relative thereto.

Because the ends of the second actuator rod slidably engage the valve element and the first actuator rod, any bending moment exerted upon the valve element when the armature shifts transversely is reduced, reducing drag and hysterisis in the control valve. Similarly, any bending moment exerted upon the solenoid armature when the valve element shifts transversely also is reduced.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
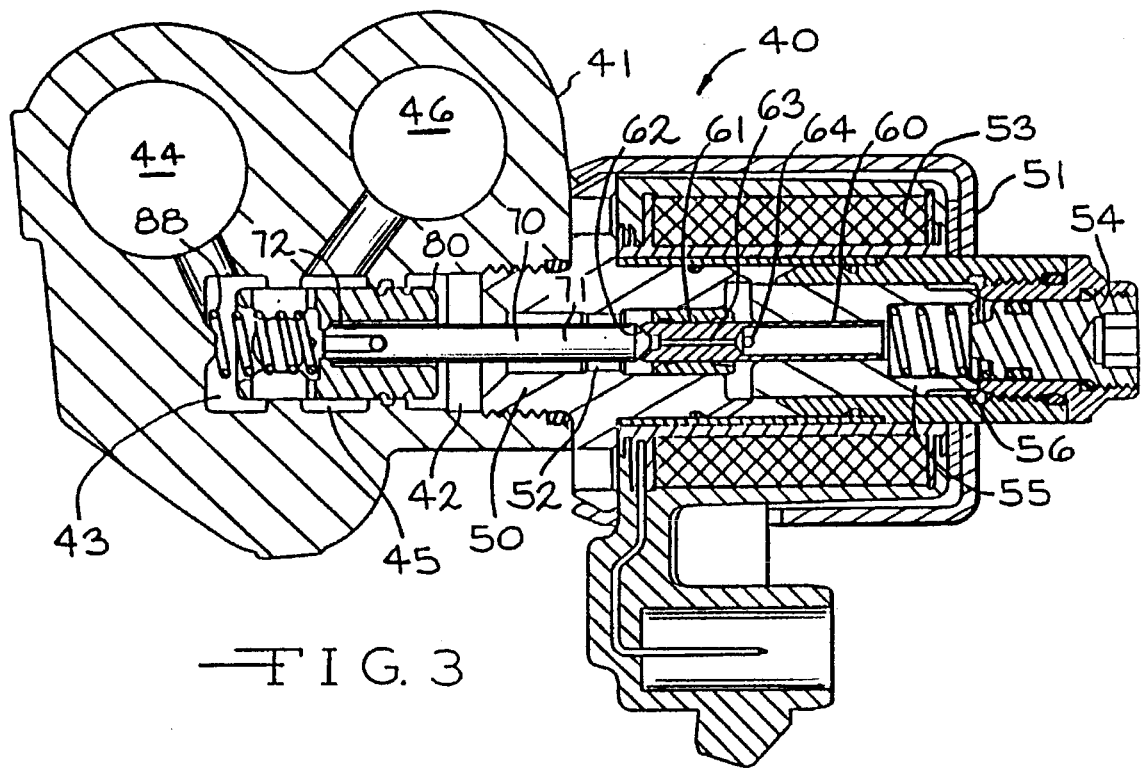
FIG. 3 is a sectional view of a control valve in accordance with the invention.

Referring again to the drawings, there is illustrated in FIG. 3 a sectional view of an improved control valve 40 in accordance with the invention. The control valve 40 includes a valve housing 41. While the valve housing 41 is illustrated as a control valve component in FIG. 3, it will be appreciated that the valve housing 41 can be formed as an integral portion of a power steering valve housing.

Figure 4:
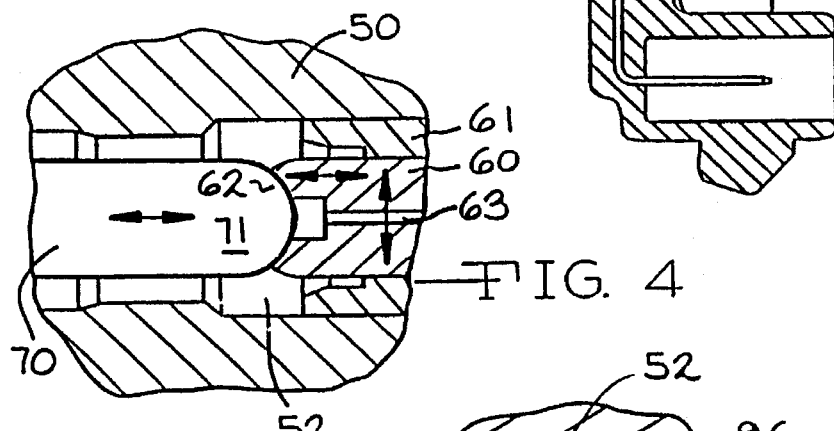
FIG. 4 is an enlarged fragmentary view of a portion of the control valve shown in FIG. 3.

The valve housing 41 has a generally cylindrical valve chamber 42 formed therein which has an open outer end and a closed inner end. The valve chamber 42 includes a first annular shaped recess formed in the inner end thereof which defines an inlet port 43. The inlet port 43 communicates with an inlet aperture 44 formed through the valve housing 41. Similarly, the valve chamber 42 also includes a second annular shaped recess formed therein which is axially displaced from the inlet port 43 and defines an outlet port 45. The outlet port 45 communicates with an outlet aperture 46 which is formed through the valve body 41. As best seen in FIG. 4, an annular shoulder 47, which extends radially into the valve chamber 42, is formed between the inlet and outlet ports 43 and 45. As will be described below, the annular shoulder 47 functions as a valve seat. A narrow annular groove 48 is formed in the surface of the valve chamber 42 adjacent to the outlet port 46. The purpose for this groove 48 will be explained below.

Figure 1:
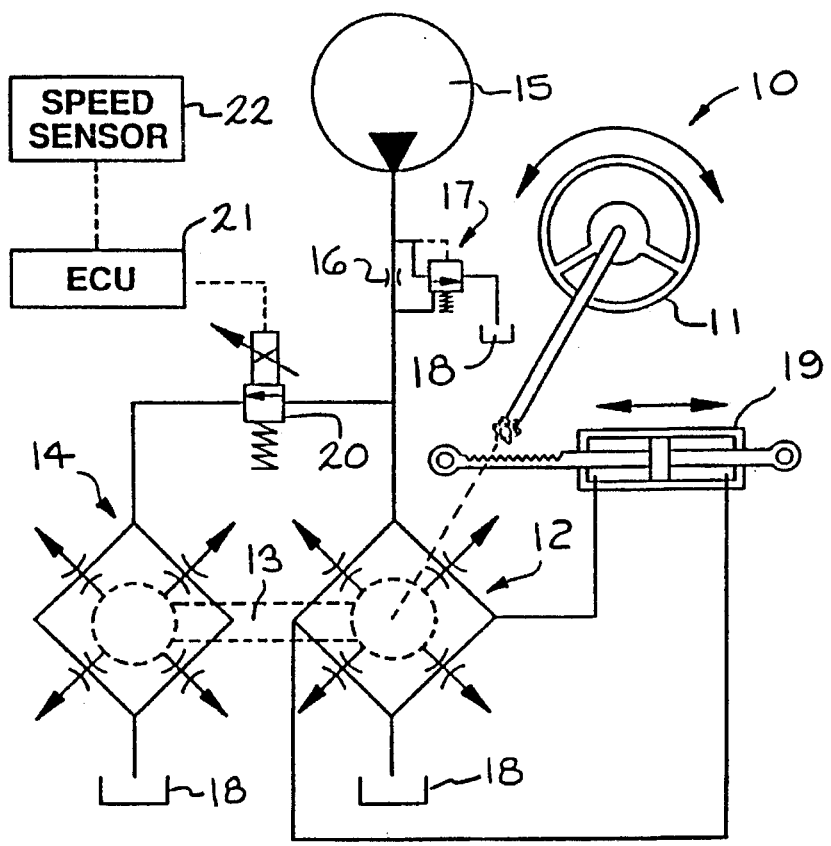
FIG. 1 is a schematic diagram of a prior aa variable assist power steering system.
Figure 2:
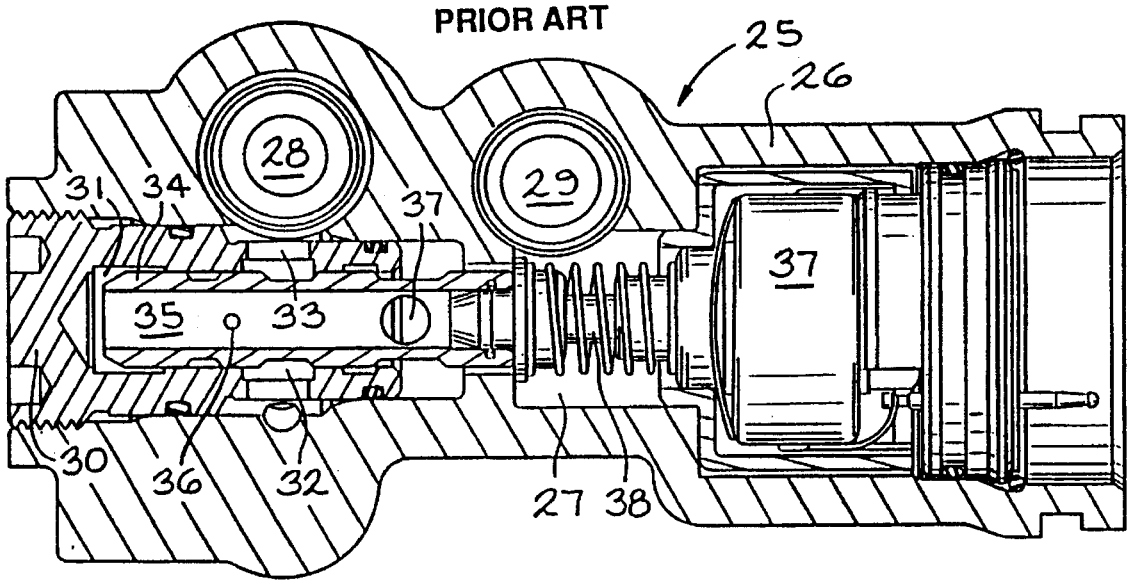
FIG. 2 is a sectional view of a prior art control valve used in the system shown in FIG. 1.

The inlet and outlet apertures 44 and 46 receive banjo bolts (not shown) which attach the control valve 40 to a power steering system valve body (not shown). The banjo bolts allow fluid communication between the power steering system and the pressure control valve 40. In the preferred embodiment, the control valve 40 is used with the power steering system 10 illustrated in FIG. 1. Accordingly, the inlet aperture 44 is connected to the discharge port of the pump 15 and the outlet aperture 46 is connected to the secondary rotary control valve 14. It will be appreciated, however, that the control valve 40 may be utilized in other configurations.

An adapter 50 is threaded into the outer end of the valve chamber 42. The adapter 50 carries a proportional solenoid 51. The solenoid 51 has a stepped cylindrical armature chamber 52 having a outer portion and a reduced diameter inner portion which communicates with the valve chamber 42. The armature chamber 52 is surrounded by a solenoid winding 53. The solenoid winding 53 is connected to the electronic control module 21 described above. A plug 54 is threaded into the outer portion of the armature chamber 52. The plug 54 can be rotated and axially moved thereby into or out of the armature chamber 52. An axially shiftable armature 55 is disposed within the outer portion of the armature chamber 52 and is free to shift axially therein. The solenoid 51 is operable to shift the armature 55 an axial distance to the left in FIG. 3 which is proportional to the magnitude of electrical current supplied to the solenoid winding 53 by the electronic control module 21. A solenoid spring 56 is disposed within the armature chamber 52 between the plug 54 and the armature 55. The solenoid spring 56 is normally compressed and exerts a force on the armature 55 towards the left in FIG. 3.

A first actuator rod 60 is carried by the armature 55 and extends axially from the armature 55 through a sleeve bushing 61 which is disposed within the inner portion of the armature chamber 52. The bushing 61 guides the actuator rod 60 within the armature chamber 52. As shown in FIG. 3, the left end of the actuator rod 60 has a generally concave shape which forms a socket 62. In the preferred embodiment, the actuator rod socket 62 has a spherical shape; however, other shapes which approximate a spherical shape, such as a frusto-conical annular surface with axial extent being short relative to the radius, can be used for the socket 62. An axial bore 63 extends into the actuator rod 60 from the surface of the socket 62. A transverse bore 64 which intersects the axial bore 63 is formed in the actuator rod 60.

A second actuator rod 70 is disposed in the armature chamber 52 and extends into the valve body valve chamber 42. In the preferred embodiment, a first end 71 of the second actuator rod 70, which is to the right in FIG. 3, has a shape which is complementary to the socket 62 formed in the end of the first actuator rod 60. Thus, in the preferred embodiment, the first end 71 of the second actuator rod 70 has a generally spherical shape. As best seen in FIG. 4, the spherical first end 71 of the second actuator rod 70 is slidably received by the socket 62 in the end of the first actuator rod 60. Thus, the second actuator rod 70 is free to pivot relative to the first actuator rod 60. Because of this, the transfer of transverse movement of the first actuator rod 60, as shown by the double-ended vertical arrow in FIG. 4, to the second actuator rod 70 is minimized. Conversely, axial movement of the first actuator rod 60, as shown by the double-ended horizontal arrow in FIG. 4, is transferred to the second actuator rod 70.

While the preferred embodiment has been described as having a socket 62 formed in the end of the first actuator rod 60 receiving a complementary-shaped end of the second actuator rod 70, it will be realized that the invention also can be practiced with a socket formed in the first end of second actuator rod 70 receiving a complementary-shaped end of the first actuator rod 60.

The second actuator rod 70 has a second end 72 which is to the left in FIG. 3. In the preferred embodiment, actuator rod second end 72 also has a spherical shape. It will be appreciated that other shapes can be used for the first and second ends 71 and 72 of the second actuator rod 70. As will be described below, the end shapes of the second actuator rod 70 are selected to be complementary to the adjoining surfaces. An axial bore 73 extends into the second actuator rod 70 from the second end 72 thereof. A transverse bore 74 which intersects the axial bore 73 is formed in the second actuator rod 70.

Figure 5:
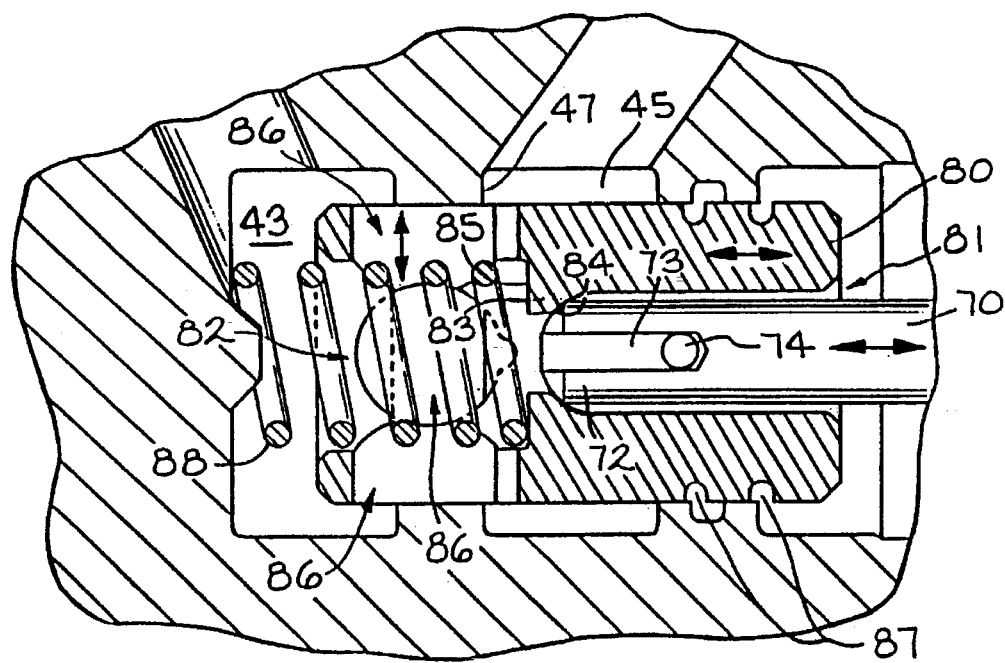
FIG. 5 is an enlarged fragmentary view of another portion of the control valve shown in FIG. 3.

A cylindrical valve element 80 is disposed within the valve chamber 42 and slidably received by the annular shoulder 47. As best seen in FIG. 5, the valve element 80 has a first axial bore 81 formed therein extending into the valve element 80 from the right end thereof. The valve element 80 also has a second axial bore 82 formed therein extending into the valve element 80 from the left end thereof. The second bore 82 communicates with the inlet port 43. While the second bore 82 is shown as having a larger diameter than the first bore 81 in FIG. 5, it will be appreciated that the bores 81 and 82 can have other diameters. The first and second bores 81 and 82 form a passageway through the valve element 80 and are separated by a narrow annular lip 83. The lip 83 has a first side 84 which forms the end surface of the first bore 81. In the preferred embodiment, the first side 84 of the lip 83 has a generally spherical shape which complements the second end 71 of the second actuator rod 70. The lip 83 also has a second side 85 having a flat annular shape which forms an end surface for the second axial bore 82. Because the lip 83 is narrow, the first and second sides 84 and 85 are in close proximity to one another.

A plurality of transverse bores 86 are formed through the valve element 80 extending radially from the second axial bore 82. As will be explained below, the transverse bores communicate with the outlet port 45. Additionally, a plurality of annular grooves 87 are formed in the outer surface of the valve element adjacent the valve chamber annular groove 48. The purpose for these annular grooves 87 will be explained below.

As shown in FIGS. 3 and 5, the second end 72 of the second actuator rod 70 is received by the first bore 81 of the valve element 80. The second end 72 of the second actuator rod 70 slidably engages the socket formed in the first side 84 of the annular lip 83. The diameter of the first bore 81 in the valve element 80 is larger than the diameter of the second actuator rod 70. Thus, the second actuator rod 70 is free to pivot relative to the valve element 80. Because of this, the transfer of transverse movement of the valve element 80, as shown by the double-ended vertical arrow in FIG. 5, to the second actuator rod 70 is minimized. Conversely, axial movement of the valve element 80, as shown by the double-ended horizontal arrow in FIG. 5, is transferred to the second actuator rod 70.

A valve spring 88 is disposed in the valve chamber 42 between the valve element 80 and the end of the valve chamber 42. One end of the valve spring 88 engages the fiat second side 85 of the annular lip 83. The valve spring 88 is normally compressed and urges the valve element 80 to the right in FIG. 5.

As described above and illustrated in FIGS. 3 and 5, the valve element 80 is slidably received by the annular shoulder 47 with a portion of the traverse bores 85 in communication with the outlet poll 45. As the valve element 80 moves to the left in FIG. 5, the portion of the transverse bores 84 in communication with the outlet port 45 is reduced. Conversely, as the valve element 80 moves to the right in FIG. 5, the portion of the transverse bores 84 in communication with the outlet port 45 is increased. Thus, the shoulder 47 functions as a valve seat which cooperates with the transverse bores 86 in the valve element 80 to define a plurality of variable orifices. The variable orifices control the amount of hydraulic fluid flowing between the inlet and outlet ports 43 and 45.

The operation of the improved control valve 40 will now be described. With the solenoid winding 53 deenergized, the valve element 80 is positioned in the valve chamber by the net forces exerted thereon by the armature and valve springs 56 and 88. As shown in FIGS. 3 and 5, a predetermined portion of the transverse bores 86 are in communication with the outlet port 45. The remainder of the transverse bores 86 are blocked by shoulder 47 or in communication with the inlet port 43. This establishes the valve position for zero current in the solenoid winding 53 and defines a valve fully open position.

Both springs 56 and 88 are compressed sufficiently to provide a linear change in net force applied to the valve element 80 for any axial displacement of the valve element 80. Pressurized hydraulic fluid supplied to the inlet port 43 flows into the second axial bore 82 of the valve element 80. The hydraulic fluid is discharged through the transverse bores 86 to the valve outlet port 45. A small portion of the hydraulic fluid flows through the axial and transverse bores 73 and 74 in the second actuator rod 70 and enters the right end of the valve chamber 42. This equalizes the fluid pressure exerted on the ends of the valve element 80. Pressurized hydraulic fluid also flows through the axial and transverse bores 63 and 64 in the first actuator rod 60 to equalize fluid pressure on the solenoid armature 55.

In the preferred embodiment, the electronic control module 21 is responsive to the speed sensor 22 to generate a current which is inversely proportional to the vehicle speed. Thus, at low vehicle speeds, a current is supplied to the solenoid winding 53 which is operative to shift the armature 55 to the left in FIGS. 3 and 5 an axial distance proportional to the current magnitude, extending the armature spring 56. The armature shift is transferred through the first and second actuator rods 60 and 70 to move the valve element 80 to the left in FIGS. 3 and 5. As the valve element 80 moves to the left, the valve spring 88 is further compressed and the orifices formed by the valve element transverse bores 86 and the outlet port 45 are reduced. The reduction of the orifices restricts the flow of hydraulic fluid through the valve 40 to the secondary rotary control valve 14. This increases the pressure of the hydraulic fluid supplied to the actuator 19, thereby increasing the amount of assistance provided by the power steering system 10. In the preferred embodiment, the valve element 80 is moved a relatively small distance such that the response forces exerted by the springs 55 and 88 remain in the linear response range of the springs. Accordingly, control valve 40 provides a linear response to the current generated by the electronic control module 20.

When the vehicle speed is increased, the electronic control module 20 reduces the current applied to the solenoid winding 53. This reduces the force being exerted upon the first actuator rod 60 by the armature 55. In response, the valve spring 88 urges the valve element 80 axially to the right in FIGS. 3 and 5. The movement of the valve element 80 is transferred through the second and first actuator rods 70 and 60 to shift the armature 55 to the right, recompressing the solenoid spring 56. The valve element 80 and armature 55 continue to move to the right until a new equilibrium position of the armature and valve springs 56 and 88 is reached. As the valve element 80 moves to the right in FIGS. 3 and 5, the variable orifices are opened, allowing an increased flow of hydraulic fluid through the valve 40 to the secondary rotary control valve 14. This also decreases the pressure of the hydraulic fluid supplied to the actuator 19, thereby reducing the amount of assistance provided by the power steering system 10.

It will be appreciated that, if there were a power failure, the armature and valve springs 56 and 88 would return the control valve 40 to a fully open position. This would reduce the assist provided by the power steering system 10 to correspond to high speed vehicle operation, which is the desired failure mode of operation.

Because the second actuator rod 70 is free to pivot with respect to the first actuator rod 60 and the valve element 80, any bending moment produced by a traverse shift of the armature 55 is minimized. Additionally, as described above, transverse loads on the valve element 80 can shift the valve element 80 without causing a corresponding transverse movement of the armature 55. Similarly, transverse loads on the armature 55 can shift the armature 55 without causing a corresponding transverse movement of the valve element 80. Accordingly, drag and hysteresis in the response of the control valve 40 are reduced. Binding between the first actuator rod 60 and the sleeve bushing 61 also is minimized. Furthermore, because the bushing 61 receives only the first actuator rod 60, the second actuator rod 70 can move transversely without binding in the bushing 61.

Additionally, because the valve spring 88 contacts the valve element 80 in close proximity to the valve element surface contacted by the second actuator rod 70, any turning moment exerted upon the valve element 80 when the valve spring 88 and second actuator rod 70 are not coaxially aligned is minimized. This reduces potential drag and hysterisis of the valve element 80 due to the valve element 80 being shifted within the valve chamber 42 by the turning moment.

The non-actuated, or zero, position of the valve element 80 can be adjusted by rotating the plug 54. Rotating the plug 54 into the armature chamber 52 compresses both the armature and valve springs 56 and 88 and shifts the valve element 80 to the left in FIGS. 3 and 5, further restricting the flow of hydraulic fluid through the valve 40. Similarly, rotating the plug 54 out of the armature chamber 52 relaxes both the armature and valve springs 56 and 88 and shifts the valve element 80 to the right in FIGS. 3 and 5, decreasing the restriction of fluid flow through the valve 40.

The control valve 40 includes means for flushing small particles of material from the armature chamber 52. As the valve element 80 moves within the valve chamber 42, the valve element grooves 87 cooperate with the groove 48 formed in the surface of the valve chamber 42 to vent hydraulic fluid from the outer end to the valve chamber to the valve outlet port 45. As the valve element 80 is moved to the left in FIG. 5, the hydraulic fluid in the outer valve element groove is moved into communication with the valve chamber groove 48. Because the hydraulic fluid pressure is higher in the outer end of the valve chamber than in the outlet port 45, a portion of the hydraulic fluid flows into the valve chamber groove 48. Upon the valve element 80 moving back to the fight in FIG. 5, the hydraulic fluid is brought into communication with the inner valve element groove and a portion of the hydraulic fluid is transferred into the inner valve element groove. When the valve element 80 is again moved to the left in FIG. 5, the inner valve element groove is moved into communication with the outlet port 45, which is at a lower pressure than the outer end of the valve chamber 42. Accordingly, a portion of the hydraulic fluid flows out of the outlet port 45. Small particles of material that may be in the armature chamber 52 which are entrained in the hydraulic fluid are removed by this action.

Figure 6:
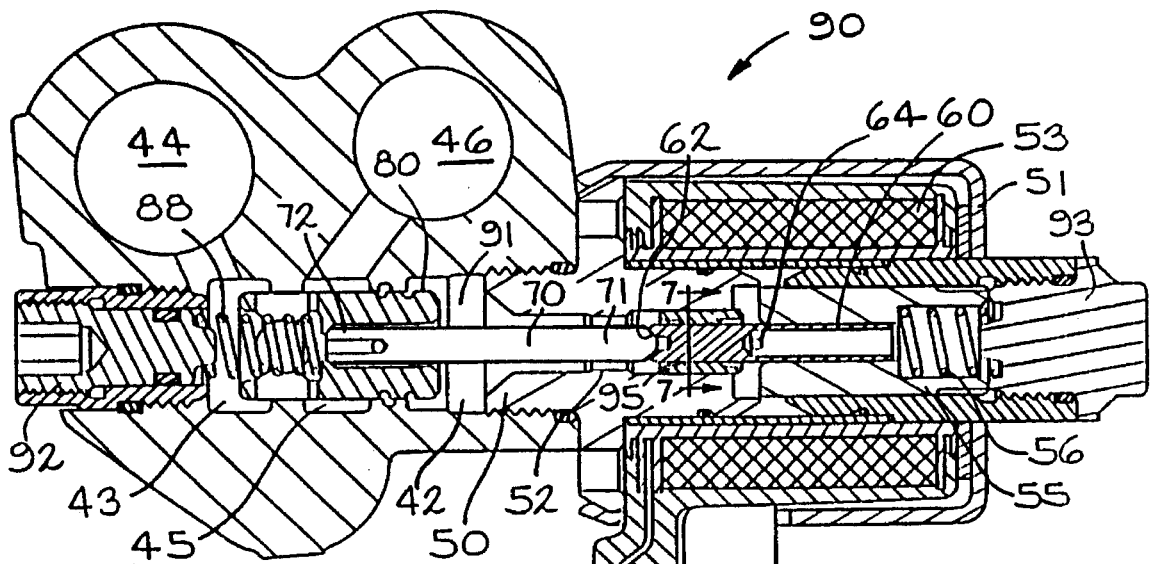
FIG. 6 is a sectional view of an alternate embodiment of the control valve shown in FIG. 3.

An alternate embodiment of the improved control valve is shown at 90 in FIG. 6. Components of the control valve 90 which are the same as components shown in FIGS. 3 and 5 are identified by the same numerical designators. The valve 90 has a valve chamber 91 which extends completely through the valve housing 41. An adjustable threaded plug 92 is received in the left end of the valve chamber 91, as shown in FIG. 6. Upon rotation, the plug 92 can be moved axially into or out of the valve chamber 91. Thus, the plug 92 can be used to adjust the rest position of the valve element 80. Accordingly, a nonadjustable end plug 93 is threaded into the outer end of the solenoid 51 to seal the armature chamber 52. The alternate location of the adjustable plug 92, as shown in FIG. 6, increases adjustment accessibility, thereby enhancing the adaptability of the valve 90.

Figure 7:
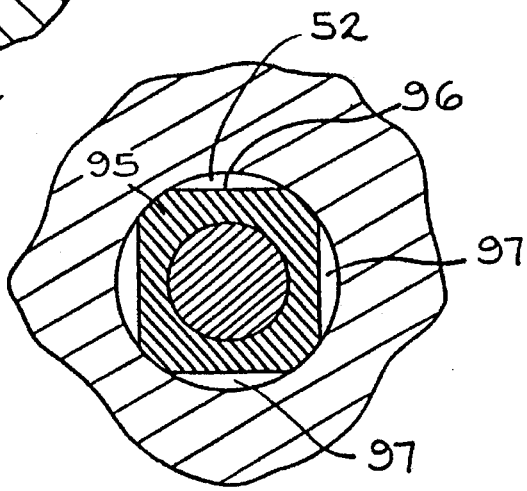
FIG. 7 is an enlarged fragmentary sectional view taken along the line 7—7 in FIG. 6.

The alternate embodiment of the control valve 90 also includes a modified actuator rod bushing 95. As best seen in FIG. 7, the bushing 95 includes a plurality of flat surfaces 96 formed on the surface thereof. The flat surfaces 96 extend the length of the bushing 95 and form corresponding spaces 97 between the bushing 95 and the surface of the armature chamber 52. The spaces 97 allow hydraulic fluid to flow past the bushing 95 and into the portion of the armature chamber 52 which includes the armature 55. Accordingly, it is not necessary to drill the axial and transverse bores 63 and 64 in the first actuator rod 60 as shown in FIG. 3. It will be appreciated that while the alternate end plug and actuator rod bushing 92 and 95 are shown with the alternate embodiment of the control valve 90, they may also be included with the preferred embodiment of the pressure control valve 40 shown in FIG. 3.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been illustrated as being responsive to vehicle speed, other vehicle operating parameters can be used. Additionally, while the actuator rod bushing has been shown as guiding the first actuator rod, it will be appreciated that the bushing can be positioned within the armature chamber to guide the second actuator rod instead.

What is claimed is:

1. A pressure control valve for use in a variable assist power steering system of a vehicle, the control valve comprising:

a housing having a valve chamber formed therein, said housing also having inlet and outlet ports formed therein which communicate with said valve chamber, said inlet port adapted to receive fluid and said outlet port adapted to discharge fluid;

a valve element disposed within said valve chamber between said inlet and outlet ports, said valve element defining a valve element axis and cooperating with said housing to define an orifice for communication between said inlet and outlet ports, said valve element being axially movable within said valve chamber to vary the size of said orifice for controlling the flow of fluid through said valve chamber;

a solenoid having an axially movable armature which is separate from said valve element, said armature defining an armature axis and being carried by said housing; and a coupling disposed between said solenoid armature and said valve element for transferring axial movement of said armature to said valve element, said coupling including an actuator rod defining an actuator rod axis and having first and second ends, said first end slidably engaging said valve element and said second end slidably engaging said solenoid armature to allow said actuator rod axis to move transversely relative to at least one of said valve element axis and said armature axis to minimize the transfer of transverse movement of one of said solenoid armature and valve element to the other of said solenoid armature and valve element while transferring axial movement therebetween.

2. A control valve as described in claim 1 wherein said actuator rod is a first actuator rod and said coupling further includes a second actuator rod having first and second ends, said first end of said second actuator rod slidably engaging said second end of said first actuator rod and being free to pivot relative thereto and said second end of said second actuator rod being coupled to said solenoid armature.

3. A control valve as described in claim 2 wherein said first end of said first actuator rod engages said valve element and is free to pivot relative thereto.

4. A control valve as described in claim 1 wherein said solenoid is a proportional solenoid with said armature movement being proportional to a vehicle operating parameter.

5. A control valve as described in claim 4 wherein said vehicle operating parameter is vehicle speed.

6. A control valve as described in claim 2 further including a first biasing means engaging said valve element and exerting a first force thereon to urge said valve element in an axial direction and a second biasing means engaging said solenoid armature and exerting a second force thereon which is opposite to and balances said first force.

7. A control valve as described in claim 6 wherein said first and second biasing means include a linear operating range and further wherein said first and second biasing means are preloaded to said linear operating ranges.

8. A control valve as described in claim 7 wherein said first and second biasing means are compression springs.

9. A control valve as described in claim 6 wherein said second end of said second actuator rod engages a first surface of said valve element and further wherein said first biasing means engages a second surface of said valve element which is adjacent to said first surface thereof.

10. A control valve as described in claim 6 further including means for adjusting the force exerted by one of said first and second biasing means.

11. A control valve as described in claim 1 wherein said valve element has a plurality of concentric annular grooves formed in the surface thereof and said valve chamber has a plurality of annular shoulders formed on the surface thereof adjacent to said valve element grooves, said valve element grooves cooperating with said valve chamber shoulders when said valve element moves in said valve chamber to shift fluid within said valve chamber.

12. A control valve as described in claim 2 wherein one of said first and second actuator rods has a generally spherically shaped end and the other of said first and second actuator rods has a generally spherical shaped recess formed in an end thereof said spherically shaped end of said one actuator rod being received in said spherically shaped recess in said end of said other actuator rod and being free to pivot therein.

13. A control valve as described in claim 3 wherein said first end of said first actuator rod has a generally spherical shape and said valve element has a generally spherical shaped recess formed therein, said spherical end of said first actuator rod being received in said spherical shaped recess in said valve element and being free to pivot therein.

14. A control valve as described in claim 2 wherein one of said first and second actuator rods has an end which has a generally frustro-conical annular shaped surface with an axial extent which is short relative to the radius, and the other of said first and second actuator rods has a recess formed in an end thereof having a generally frustro-conical annular shaped surface with an axial extent which is short relative to the radius, said conical shaped end of said one actuator rod being received in said conical shaped recess in said end of said other actuator rod and being free to pivot therein.

15. A control valve as described in claim 2 wherein at least one of said first and second actuator rods has an axial passageway and a transverse passageway formed therethrough, said passageways intersecting to form a passageway for equalizing fluid pressure within the control valve.

16. A control valve as described in claim 2 further including a bushing disposed in said valve chamber, said bushing having an axial bore formed therethrough which receives a portion of one of said first and second actuator rods for guiding said actuator rod within said valve chamber, said bushing having at least one flat surface formed on an exterior surface thereof, said flat surface extending along the length of said bushing to allow fluid communication between the ends of said bushing.

17. A control valve as described in claim 1 wherein said valve element has a recess formed in an end thereof which is adjacent to said actuator rod, said recess receiving and retaining said first end of said actuator rod to form a pivoting connection, said pivoting connection operable to prevent lateral motion of said first end of said actuator rod relative to said valve element.

18. A control valve as described in claim 1 wherein said solenoid armature has a recess formed in an end thereof which is adjacent to said actuator rod, said recess receiving and retaining said second end of said actuator rod to form a pivoting connection, said pivoting connection operable to prevent lateral motion of said second end of said actuator rod relative to said solenoid armature.

19. A control valve as described in claim 17 wherein said solenoid armature has a recess formed in an end thereof which is adjacent to said actuator rod, said recess receiving and retaining said second end of said actuator rod to form a pivoting connection, said pivoting connection operable to prevent lateral of said second end of said actuator rod relative to said solenoid armature.

* * * * *